United States Patent
Bahnmüller et al.

(10) Patent No.: US 12,072,254 B2
(45) Date of Patent: Aug. 27, 2024

(54) ELECTRIC CIRCUITRY WITH DIFFERENTLY ORIENTED RING OSCILLATORS FOR STRAIN MEASUREMENT

(71) Applicant: Sciosense B.V., AE Eindhoven (NL)

(72) Inventors: Friedrich Bahnmüller, Karlsruhe (DE); Oliver Hertner, Graben-Neudorf (DE); Frank Lemke, Mutterstadt (DE); Georg Jedelhauser, Bad Soden (DE)

(73) Assignee: Sciosense B.V., AE Eindhoven (NL)

( * ) Notice: Subject to any disclaimer, the term of this patent is extended or adjusted under 35 U.S.C. 154(b) by 248 days.

(21) Appl. No.: 17/597,687

(22) PCT Filed: Jul. 20, 2020

(86) PCT No.: PCT/EP2020/070457
§ 371 (c)(1),
(2) Date: Jan. 18, 2022

(87) PCT Pub. No.: WO2021/028156
PCT Pub. Date: Feb. 18, 2021

(65) Prior Publication Data
US 2022/0260437 A1  Aug. 18, 2022

(30) Foreign Application Priority Data
Aug. 9, 2019 (EP) .................. 19191055

(51) Int. Cl.
*G01L 1/18* (2006.01)
*G01B 7/16* (2006.01)

(52) U.S. Cl.
CPC ............ *G01L 1/183* (2013.01); *G01B 7/18* (2013.01)

(58) Field of Classification Search
None
See application file for complete search history.

(56) References Cited

U.S. PATENT DOCUMENTS 4,096,740 A   6/1978  Sallee
5,281,836 A * 1/1994  Mosser .............. H05B 3/48
                                                257/419

(Continued)

FOREIGN PATENT DOCUMENTS

CN   1892235 A   1/2007
CN   1932462 A   3/2007

(Continued)

OTHER PUBLICATIONS

Bittle, D. A. et al., "Piezoresistive Stress Sensors for Structural Analysis of Electronic Packages", Journal of Electronic Packaging, Sep. 1991, vol. 113, 203-215, Total 13 pages.

(Continued)

*Primary Examiner* — Brandi N Hopkins
*Assistant Examiner* — Nigel H Plumb
(74) *Attorney, Agent, or Firm* — Slater Matsil, LLP

(57) ABSTRACT

In an embodiment an electric circuitry includes at least one first ring oscillator and at least one second ring oscillator being arranged on a substrate in different orientations, a time-to-digital converter having a converter ring oscillator and a processing circuit, wherein a first time is determined by a period duration of at least one first ring oscillator, this period duration depending on the propagation delay time of first delay elements, wherein a second time is determined by a period duration of at least one second ring oscillator, this period duration depending on the propagation delay time of second delay elements, and wherein the processing circuit is configured to determine a magnitude of the strain applied on the substrate based on a first state of the converter ring oscillator at the first time and a second state of the converter ring oscillator the second time.

15 Claims, 13 Drawing Sheets

(56) References Cited

U.S. PATENT DOCUMENTS

| | | | |
|---|---|---|---|
| 7,414,483 | B2 | 8/2008 | Shimamoto |
| 7,504,896 | B2 | 3/2009 | Bhushan et al. |
| 9,088,288 | B1 | 7/2015 | Rosen |
| 9,970,830 | B2 | 5/2018 | Kothandaraman et al. |
| 2009/0319202 | A1 | 12/2009 | Gebara et al. |
| 2012/0006122 | A1 | 1/2012 | Aitken |
| 2015/0188553 | A1 | 7/2015 | Familia et al. |
| 2016/0241186 | A1 | 8/2016 | Motz |
| 2018/0217012 | A1* | 8/2018 | Kothandaraman ............ G01R 31/2831 |

FOREIGN PATENT DOCUMENTS

| | | |
|---|---|---|
| CN | 101140313 A | 3/2008 |
| CN | 106556790 A | 4/2017 |
| EP | 0508232 A2 | 10/1992 |
| JP | S62100613 A | 5/1987 |
| TW | 201837921 A | 10/2018 |
| TW | 201911577 A | 3/2019 |

OTHER PUBLICATIONS

Bomholt, J., "Electrical pressure measurement based on piezoresistive technology," www.keller-druck.com, For Pressure Measurement Technology, 1984, Total 25 pages.

Chang, Wen-Teng et al., "Stress-induced capacitance approximation using ring oscillator delay", International Symposium on Next Generation Electronics, Nov. 18-19, 2010, IEEE, Kaohsiung, Taiwan, Total 2 pages.

Colman, D. et al., "Mobility Anisotropy and Piezoresistance in Silicon p-Type Inversion Layers", Journal of Applied Physics, 1968, vol. 39, 1923, Abstract, https://doi.org/10.1063/1.1656464, Total pp. 3.

Dorey, A. P., "The effect of strain on MOS transistors", Solid-State Electronics, Mar. 1969, vol. 12, Issue 3, pp. 185-189, Abstract, Total pp. 7.

Henzler, S., "Time-to-Digital Converters Basics", Springer Series in Advanced Microelectronics, 2010, vol. 29, pp. 44-47 and 74-79.

Hussain, S. et al., "Current dependence of the piezoresistive coefficients of CMOS FETs on (100) silicon", 44th European Solid State Device Research Conference (ESSDERC), Sep. 22-26, 2014, IEEE, Venice, Italy, Total pp. 2.

Kinsman, K. R., "The Mechanics of Molded Plastic Packages", Journal of Metals, Jun. 1988, pp. 23-29, Total pp. 7.

Neumeister, J., "A silicon pressure sensor using mos ring oscillators", Sensors and Actuators, Jul. 1985, vol. 7, Issue 3, 167-176, Abstract, Total pp. 2.

Kelley, "Plane Strain", Solid Mechanics Part 1, pp. 101-109, retrieved from http://homepages.engineering.auckland.ac.nz/~pkel015/SolidMechanicsBooks/Part_I/BookSM_Part_1/04_Strain/04_Strain_02_Plane_Strain.pdf.

Rathore, P.K. et al., "CMOS-MEMS integrated MOSFET embedded bridge structure based pressure sensor", Annual IEEE India Conference (INDICON), Dec. 13-15, 2013, IEEE, Mumbai, India, Total pp. 2.

Schorner, R. et al., "Silicon pressure sensor with frequency output", Sensors and Actuators A: Physical, Feb. 1990, vol. 21, Issues 1-3, pp. 73-78, Abstract, Total p. 1.

Suhling, J. C. et al., "Silicon Piezoresistive Stress Sensors and Their Application in Electronic Packaging", IEEE Sensors Journal, Jun. 2001, vol. 1, No. 1, pp. 14-30, Total pp. 17.

Vishay Precision Group, "Strain Gage Rosettes: Selection, Application and Data Reduction", TN-515, Intertechnology Inc., Toronto, CA, Total pp. 12.

Wikipedia, "Poisson's ratio", retrieved on Dec. 4, 2018, Total pp. 8.

Zhang Zhao-Hua et al., "Accelerometer Design Using MOS Ring Oscillator", Frontiers of Electrical and Electronic Engineering in China, Jan. 2006, vol. 1, Issue 1, pp. 77-81, Total pp. 2.

* cited by examiner

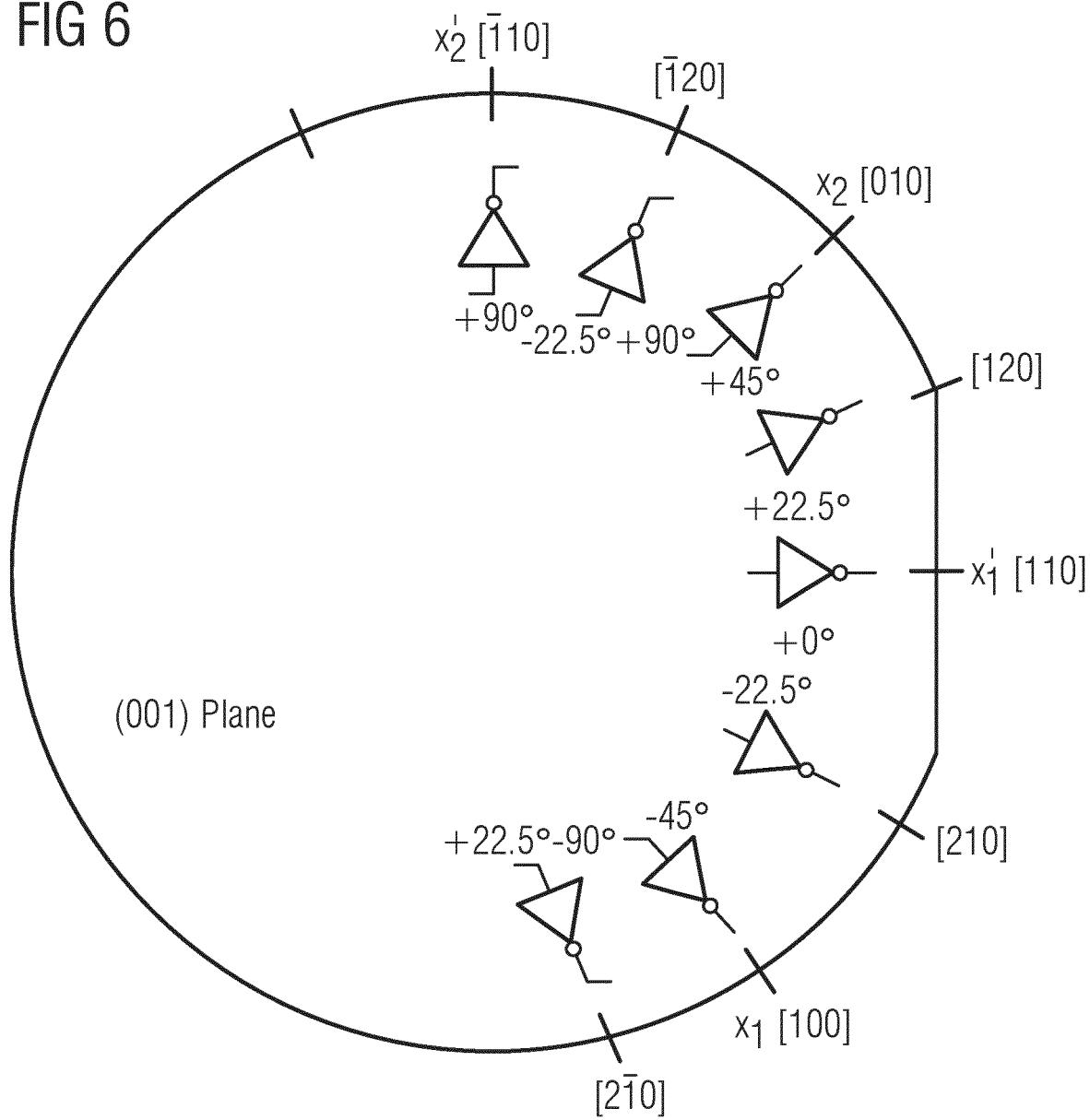

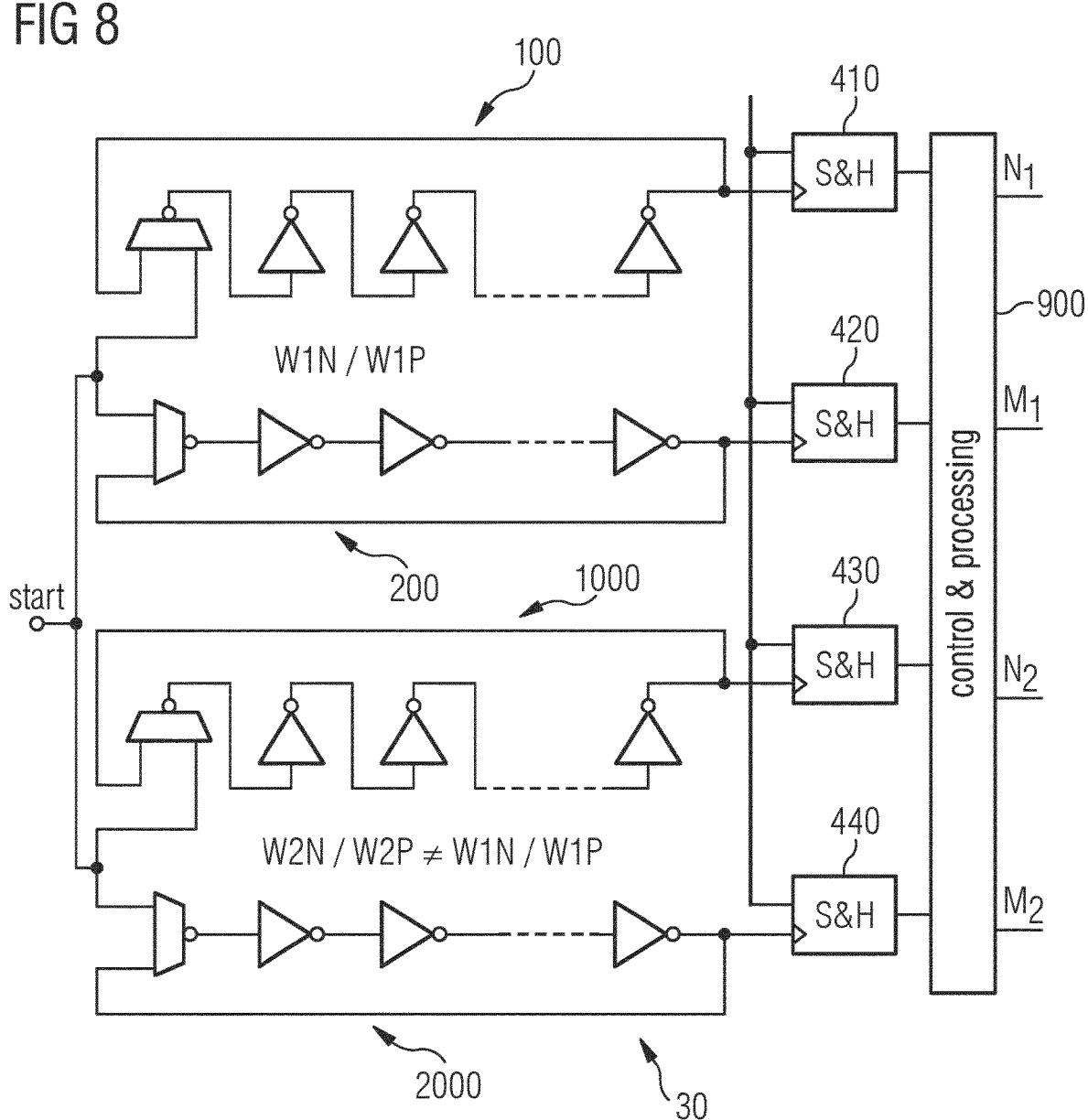

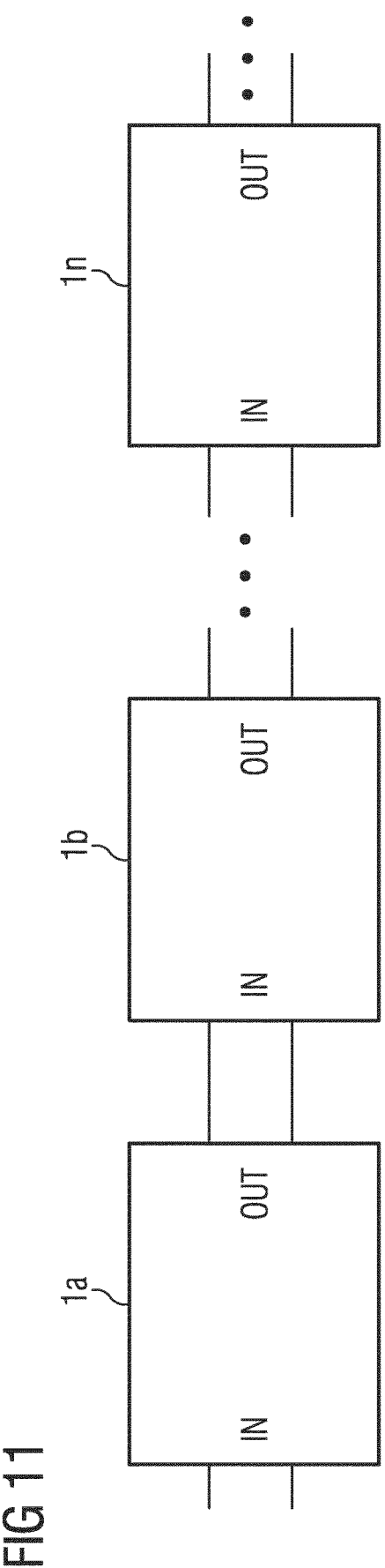

ELECTRIC CIRCUITRY WITH DIFFERENTLY ORIENTED RING OSCILLATORS FOR STRAIN MEASUREMENT

This patent application is the national stage entry of International Patent Application No. PCT/EP2020/070457, filed on Jul. 20, 2020, which claims the priority of the European Patent Application 19191055.3, filed on Aug. 9, 2019, the disclosure of both is hereby incorporated by reference.

TECHNICAL FIELD

The disclosure relates to an electric circuitry for strain measurement caused by a mechanical deformation of a substrate.

BACKGROUND

The electronic characteristics of a substrate, for example a silicon substrate, on which an electronic circuit is disposed or in which an electronic circuit is embedded are highly sensitive to mechanical deformation caused by strain and stress. The strain often causes parasitic effects which degrades the performance of electronic circuits on the substrate in respect to temperature drift, accuracy, resolution or other parameters of the electronic circuits. Typically, neither the magnitude of the strain nor the direction of maximal strain are accessible.

Strain is largely measured with strain gauges connected to an analog-to-digital converter. Typically, the strain gauge foil has to be glued onto the object of interest and wired with an amplifier or analog-to-digital converter. This technique is used for load cells as well as for experimental setups. Often in these setups, the force or stress is calculated out of the results of the measured strain results.

Another way where strain is indirectly in use are micromechanical sensors. On a micromechanical sensing element like a cantilever of an acceleration sensor or a membrane of a pressure sensor a strain sensing element is integrated. The strain sensing elements are very often silicon resistors which are available on the process and as well an amplifier and/or an analog-to-digital converter for signal processing. Depending on the requirement of the application, the electronics are integrated on the same substrate or discretely connected. A typical problem is the strain deformation of the complete piece of substrate so that the electronic arranged on the substrate suffers in resolution, accuracy or temperature drift. Therefore, the electronic is often placed away from the sensor, sometimes even on a separate wafer dice.

Further, setups are known to measure the stress on the substrate caused by packing in more experimental setups, more with the intention to control or reduce the strain with further measures.

There is a desire to provide an electric circuitry for strain measurement which allows to precisely measure a magnitude of the strain applied on the substrate caused by stress like bending, torque, force etc.

SUMMARY OF THE INVENTION

An embodiment of an electric circuitry for strain measurement allows to determine a magnitude of mechanical stress applied to a substrate.

The electric circuitry for strain measurement comprises at least a first delay chain of a plurality of delay elements and at least a second delay chain of a plurality of delay elements being arranged on a substrate. The propagation delay time of the respective delay elements of the at least one first and second delay chain is dependent on the strain applied to the substrate. The delay elements of the at least one first delay chain have other orientation than the delay elements of the at least one second delay chain. The electric circuitry comprises a processing circuit to determine a magnitude of the strain applied on the substrate in dependence on a first signal propagation delay time of the first delay chain and a second signal propagation delay time of the second delay chain.

According to a possible embodiment, at least a first ring oscillator and at least a second ring oscillator are arranged on a substrate in different orientations. The at least one first ring oscillator comprises the at least one first delay chain and the at least one second ring oscillator comprises the at least one second delay chain. The at least one first ring oscillator has a first oscillation frequency being dependent on the direction of a strain applied on the substrate. The at least one second ring oscillator has a second oscillation frequency being dependent on the direction of the strain applied on the substrate. The electric circuitry further comprises a processing circuit to determine a magnitude of the strain applied on the substrate in dependence on the first and second oscillation frequencies.

A dice is typically melted into a package and the package is soldered on a printed circuit board. So any mechanical stress applied to the printed circuit board is transferred to the silicon dice and can be measured as strain. In contrast to conventional methods for strain measurement, the proposed electric circuitry allows to integrate strain measurement monolithically with the electronics on the same dice on a standard, mainly digital CMOS process. Integrating a strain measurement on a substrate is revolutionary.

In other words, the substrate, for example a silicon substrate, is considered as a sensor itself where the integrated circuit is a sensor for strain. The strain may be applied to the substrate by any cause. The electric circuitry/sensor for strain measurement and other electronic components are integrated on the same dice in the same process on the same substrate. Main elements of the electric circuitry are ring oscillators in different orientations, which transduce the strain into strain-dependent oscillations. According to a possible embodiment, the electric circuitry may comprise a time-to-digital converter with picosecond time resolution to convert the period of oscillation into digital values.

Furthermore, certain measures are undertaken to make the electric circuitry insensitive to strain, for example by ratiometric measurements. State of the art analog electronics would apply amplifier and analog-to-digital converter. For on-chip signal processing, state of the art electronic lacks the influence of strain on all electronic components, namely amplifier and analog-to-digital converter. The analog-to-digital converter itself suffers from strain inaccuracy. To control the strain dependency of these electronic in all process corners of voltage, temperature and voltage and lifetime is an engineering task of high expertise. The proposed electric circuitry for strain measurement uses ratiometric measurement and/or a time-to-digital converter to fight and compensate these effects.

According to a possible embodiment, the electric circuitry may provide a fully integrated sensor on a digital standard process. The electric circuitry may be configured as a monolithic integrated strain sensor out of digital gates in standard packages. In particular, the electric circuitry for strain measurement can be monolithically integrated with other electronic components on a digital standard process. Nevertheless, the implementation by other, for example more complex processes such as analog-CMOS or SiGe processes, is possible.

The electric circuitry for strain measurement allows the detection of the amplitude of strain and the angle of strain. The main axis of the strain is measured by providing ring oscillators with different angular orientation on the substrate. The measured strain may be transduced into digital values. By using an array of electric circuitries for strain measurement/array of sensors, gradients of the strain are also detectable.

The circuitry allows a measurement of strain with on-chip reference. No external time reference for counting is needed. The circuitry provides an integrated strain compensation of measurement electronics. The used ratiometric measurement method allows a PVT compensation. The electric circuitry for strain measurement is suitable as ASIC, IP or a standard product. The circuitry allows a process and lifetime monitoring, and has a low current consumption. Furthermore, the electric circuitry provides a fast conversion rate. The electric circuitry may be used as a new sensor type, like bending detectors or force switches. Moreover, strain gauges with digital interface are easily applicable.

A typical application of the electric circuitry may be a strain monitoring over lifetime of equipment. More application ideas are, for example, the sensing of strain caused by the mounting of a chip on a substrate, for example a PCB. The PCB may be considered as a strain sensor itself, like for a strain-triggered switch. Also this kind of switch would not be sensitive to EMC-like capacitive switches. Such non-capacitive switches may also be triggered with gloves (little capacitive impact), for example in winter or in industrially harsh environments.

Additional features and advantages are set forth in the detailed description that follows. It is to be understood that both the foregoing general description and the following detailed description are merely exemplary, and are intended to provide an overview or framework for understanding the nature and character of the claims.

BRIEF DESCRIPTION OF THE DRAWINGS

The accompanying drawings are included to provide further understanding, and are incorporated in, and constitute a part of, the specification. As such, the disclosure will be more fully understood from the following detailed description, taken in conjunction with the accompanying figures in which:

FIG. 6 shows a possible orientations of gates on a wafer to be used for a ring oscillator of the electric circuitry for strain measurement;

FIG. 8 shows an embodiment of an electric circuitry for strain measurement with compensation of second order PVT effects;

FIG. 11 shows a sensor arrangement with sensor devices coupled to each other in a Daisy-Chain configuration.

DETAILED DESCRIPTION OF ILLUSTRATIVE EMBODIMENTS

Figure 1:
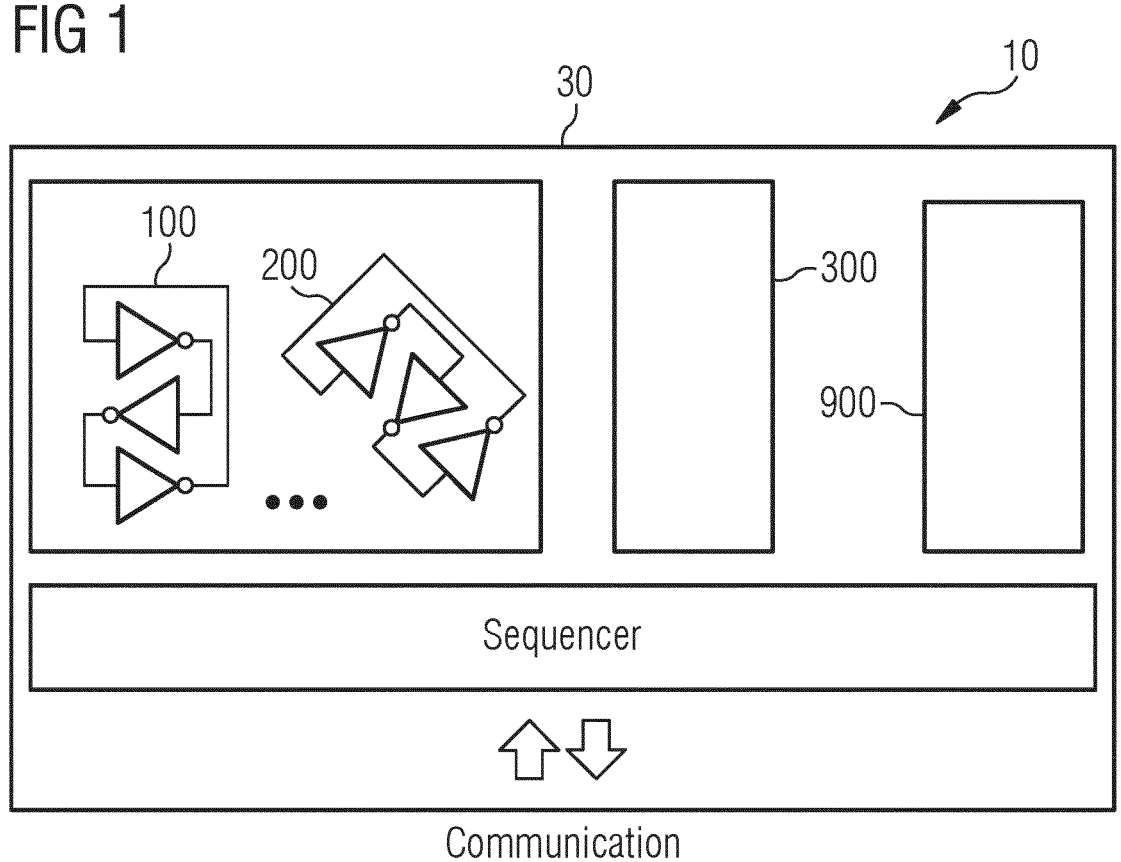
FIG. 1 shows a block diagram of components of an electric circuitry for strain measurement.

FIG. 1 shows a block diagram illustrating circuit blocks of an electric circuitry 10 for strain measurement. The circuitry 10 can be used to measure the deformation of a substrate 30, for example a silicon substrate in a monolithic integrated circuit. The embodiment of the electric circuitry 10 shown in FIG. 1 comprises several strain-dependent ring oscillators 100, 200, a time-to-digital converter 300 and a calculation unit goo integrated on the same substrate 30 where all components underlay the same deformations. According to the embodiment shown in the block diagram of FIG. 1, the electric circuitry 10 can be configured as a monolithic integrated strain sensor transducer which enables to measure deformation of the substrate/dice 30. The electric circuitry may be implemented on a digital standard process, where the electronics is also placed in the strained region of the dice/substrate. The implementation on other processes (analog, SiGe) is possible.

The electric circuitry 10 may be configured to measure all plane strain components applied on the substrate 30. In particular, the electric circuitry is configured to measure a main axis of maximal and minimal strain, strain on given axis, a difference of orthogonal strain, gradients of strain on the substrate as well as tensile or compressive strain. The substrate/dice of the electric circuitry 10 may be assembled in a standard chip package (QFN, QFP, etc.), a chip scale package, a chip-on-board, a chip-on-glass, a chip-on-surface, a flexible chip/sensor foils or a mould into material.

The strain sensing elements of the electric circuitry may be embodied as the ring oscillators 100, 200, where the mobility of electrons in and holes in MOSFET are strain-dependent, and where the oscillation period varies with strain. The ring oscillators may be arranged to rosettes with several angular orientations.

The time-to-digital converter 300 is provided for a time-digital-conversion which allows a fast measurement cycle, less than a microsecond, and highest resolution. Furthermore, the time-to-digital converter 300 may provide reduced strain sensitivity of timing reference by a combination of perpendicular MOSFETs. A design with digital standard gates is possible. As a further advantage, there is no need for external components like capacitors or strain gauges. Moreover, the complete circuit may be set in a current-less stand-by mode.

The electric circuitry 10 may comprise two ring oscillators for strain detection which enables the measurement of magnitude strain direction of the strain sensitive elements of the ring oscillators as well as the detection of tensile or compressive strain longitudinal or transversal to main axis.

According to another embodiment, the electric circuitry 10 may comprise four ring oscillators which allows the measurement of magnitude strain and the axes of maximal and minimal strain.

Due to ratiometric evaluation of the different delays of the ring oscillators, the electric circuitry provides a ratiometric compensation of PVT (Process Voltage Temperature). In particular, the ring oscillators are arranged in pairs of 90° rotation offset. The mobility of electrons and holes is affected longitudinal and transversal to the applied strain in opposite direction, but the PVT variation remains the same. In conclusion, variations in process, temperature or voltage are cancelled out by ratiometric measurement.

Figure 2A:
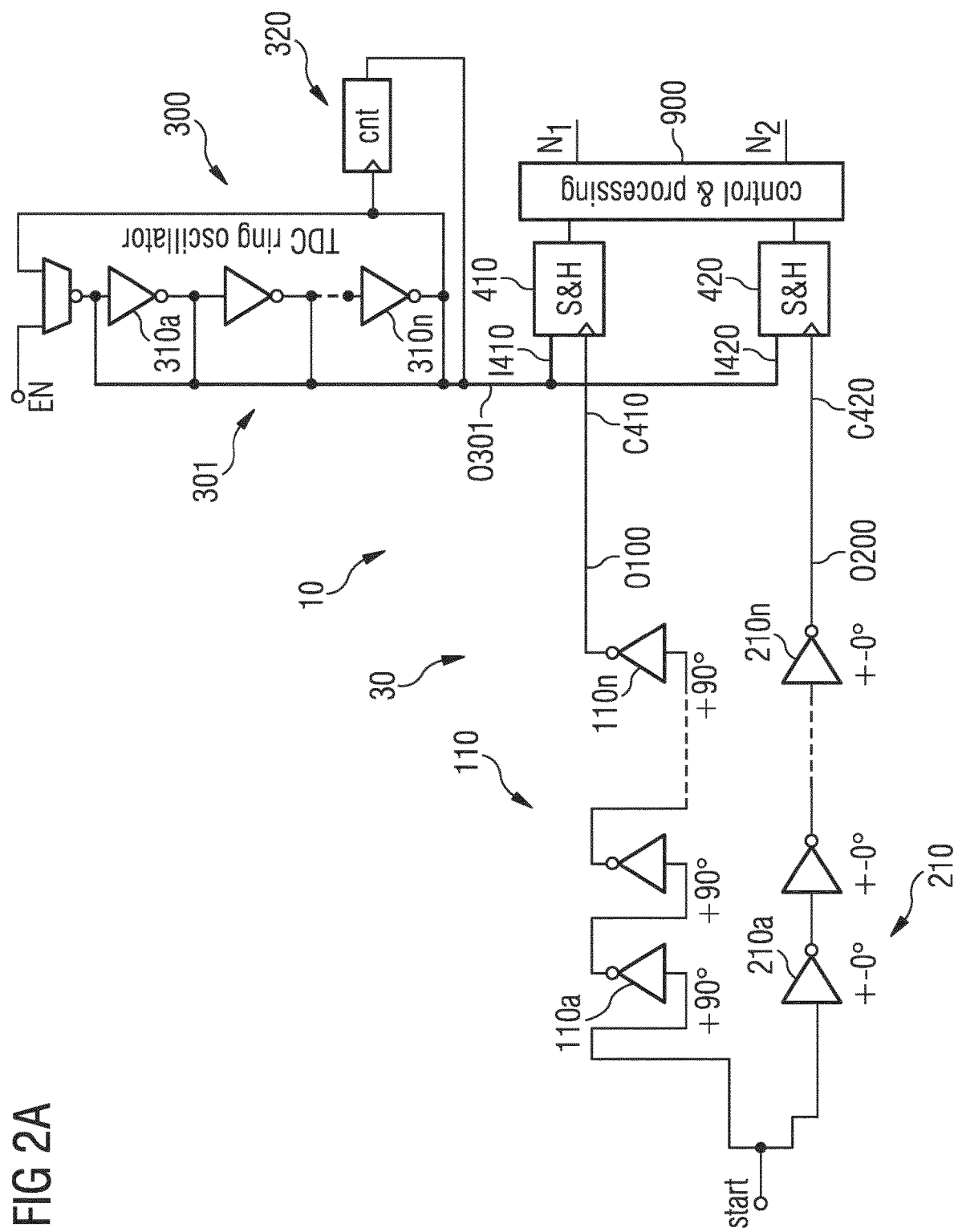
FIG. 2A shows a first embodiment of an electric circuitry for strain measurement using chains of delay elements.

FIG. 2A shows an embodiment of an electric circuitry 10 for strain measurement comprising at least a first delay chain 110 of a plurality of delay elements 110a, ..., 110n and at least a second delay chain 210 of a plurality of delay elements 210a, ..., 210n being arranged on a substrate 30, for example a silicon substrate. The propagation delay time of the respective delay elements 110a, ..., 110n and 220a, ..., 220n of the at least one first and second delay chain 110 and 210 is dependent on the strain applied to the substrate 30. The delay elements 110a, ..., 110n of the at least one first delay chain 110 have other orientation on the substrate 30 than the delay elements 210a, ..., 210n of the at least one second delay chain 210. The at least one first delay chain 110 has a first signal propagation delay time being dependent on the direction of the strain applied on the substrate 30. The at least one second delay chain 210 has a second signal propagation delay time being dependent on the direction of the strain applied on the substrate 30. The electric circuitry 10 further comprises a processing circuit 900 to determine a magnitude of the strain applied on the substrate 30 in dependence on a first signal propagation delay time of the first delay chain 110 and the second delay chain 210.

The delay elements 110a, ..., 110n of the at least one first delay chain 110 and the delay elements 210a, ..., 210n of the at least one second delay chain 210 may be oriented perpendicular to each other. It should be noted that the alignment of the delay elements of the first and second delay chain 110, 210 with an angular offset of 90° is not mandatory. The important factor is that the respective delay elements in the first and second delay chains 110 and 210 are arranged in different directions on the substrate 30.

The electric circuitry 10 for strain measurement comprises a time-to-digital converter/TDC 300 having a ring oscillator 301. The ring oscillator 301 comprises delay elements/gates 310a, ..., 310n being subsequently arranged in a chain. The time-to-digital converter 300 may be configured as a looped time-to-digital converter. However, any other configuration of the time-to-digital converter 300 is possible. The ring oscillator 301 of the time-to-digital converter has an output side O301 to generate an output signal of the ring oscillator 301 in response to a state of the ring oscillator 301 of the time-to-digital converter 300.

The processing circuit goo is configured to determine the magnitude of the strain applied on the substrate 30 in dependence on a ratio between a first value N1 representing a first decoded state of the ring oscillator 301 of the time-to-digital converter 300 detected at a first time, and a second value N2 representing a second decoded state of the ring oscillator 301 of the time-to-digital converter 300 detected at a second time.

The first time is determined by the signal propagation delay time of the at least one first delay chain 110. The signal propagation delay time of the at least one first delay chain 11 is dependent on the propagation delay time of the delay elements 110a, ..., 110n. The signal propagation delay time of the at least one first delay chain 110 may specify the time being necessary for a signal to propagate through the complete chain of delay elements 110a, ..., 110n.

The second time is determined by the signal propagation delay time of the at least one second delay chain 210. The signal propagation delay time of the at least one second delay chain 210 is dependent on the propagation delay time of the delay elements 210a, ..., 210n. The signal propagation delay time of the at least one second delay chain 210 may specify the time being necessary for a signal to propagate through the complete chain of delay elements 210a, ..., 210n.

The electric circuitry for strain measurement comprises at least one first storage circuit 410 to store the first state of the ring oscillator 301 of the time-to-digital converter 300. The storing of the first state of the ring oscillator 301 is controlled by the at least one first delay chain 110. The electric circuitry further comprises at least one second storage circuit 420 to store the second state of the ring oscillator 301 of the time-to-digital converter 300. The storing of the second state of the ring oscillator 301 is controlled by the at least one second delay chain 210.

The time-to-digital converter 300 of FIG. 2A comprises a counter 320 to provide a counting value that is stored in one of the storage circuits 410 and 420 and which represents a state of the time-to-digital converter 300. The storage circuits 410 and 420 may be configured as sample and hold elements.

The circuit configuration of the electric circuitry 10 of FIG. 2A is characterized by the different orientation, for example a perpendicular orientation, pf the delay elements of the delay chains 110 and 210 on the substrate 30. Both delay chains 110 and 210 are started at the same time. The results of the processing circuit 900 specifying the magnitude of strain applied to the substrate 30 are proportional to a ratio of TDC counts N1 and N2. The electric circuitry 10 is further characterized by the elimination of the strain dependency of the TDC ring oscillator 301, because the circuit performs a strain measurement by a ratiometric evaluation of the values N1 and N2.

The electric circuitry 10 of the embodiment shown in FIG. 2A has delay chains 110 and 210 as time basis. The electric circuitry 10 has two channels with a storage circuit 410 and a storage circuit 420, each are tapped to the TDC ring oscillator 301. The TDC ring oscillator 301 has an own enable signal EN to start or stop the oscillation. This is important to reach lowest current consumption when no measurement is done. The strain-dependent delay chains 110 and 210 trigger the storage stage of the storage circuits/sample and hold elements 410 and 420 of one channel.

Time basis for quantization is the propagation delay of the delay elements/gates in the TDC ring oscillator 301. The following processing unit 900 is able to calculate the values N1 and N2 representing the signal propagation delay time of each delay chain 110 and 210 or representing the first and second decoded state of the ring oscillator 301 of the time-to-digital converter 300.

Figure 2B:
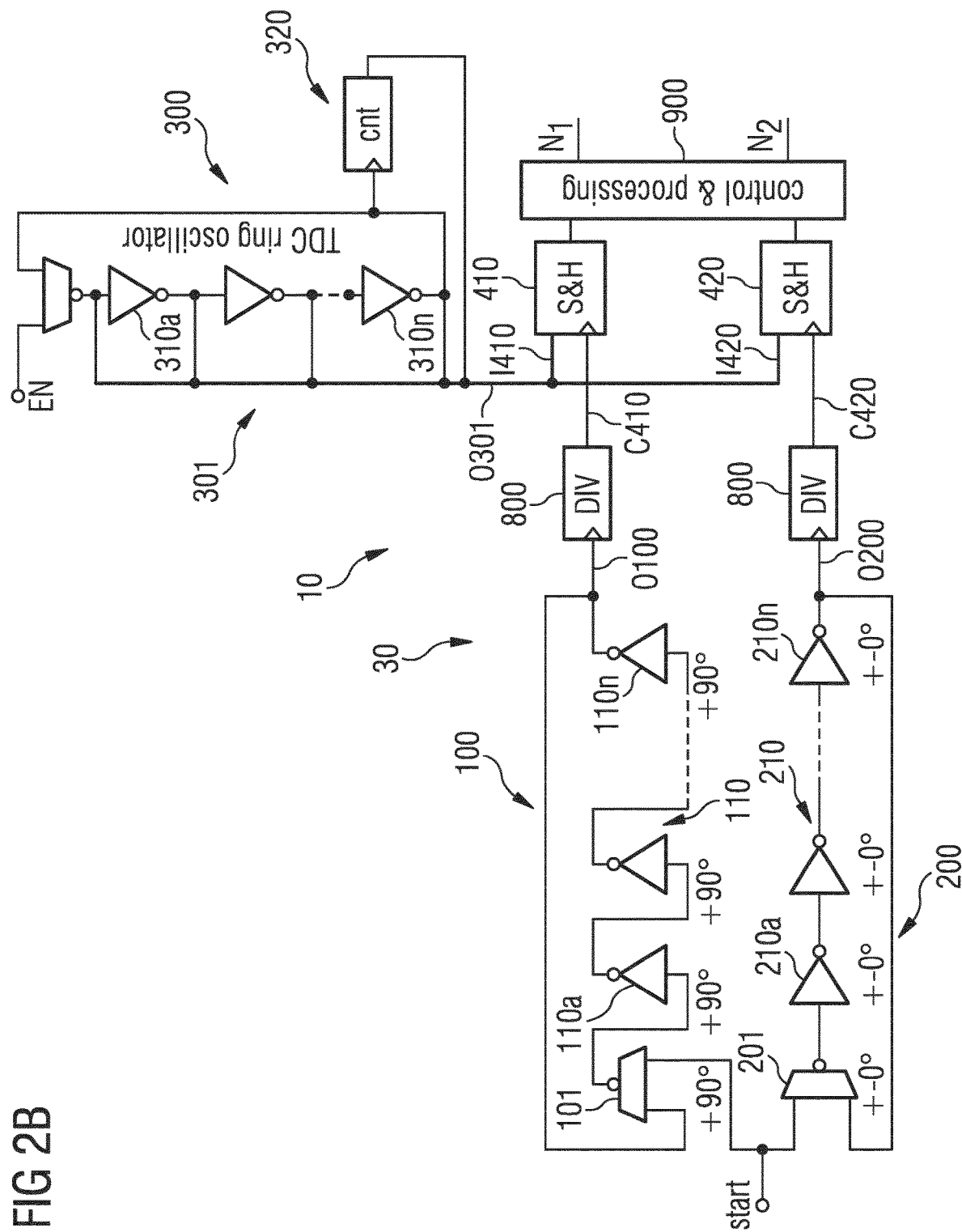
FIG. 2B shows a first embodiment of an electric circuitry for strain measurement using ring oscillators.
Figure 3:
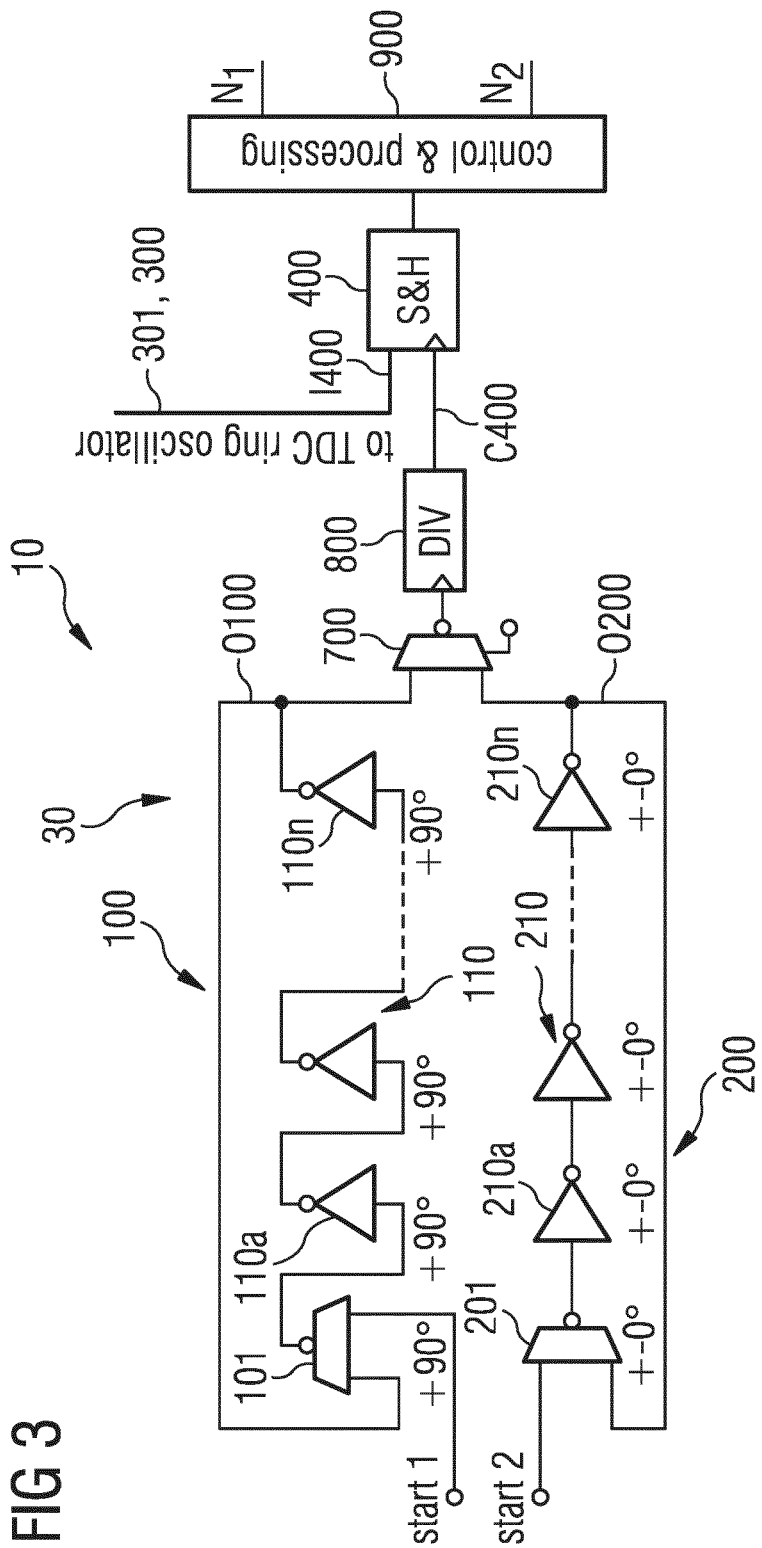
FIG. 3 shows a second embodiment of an electric circuitry for strain measurement using ring oscillators.
Figure 5:
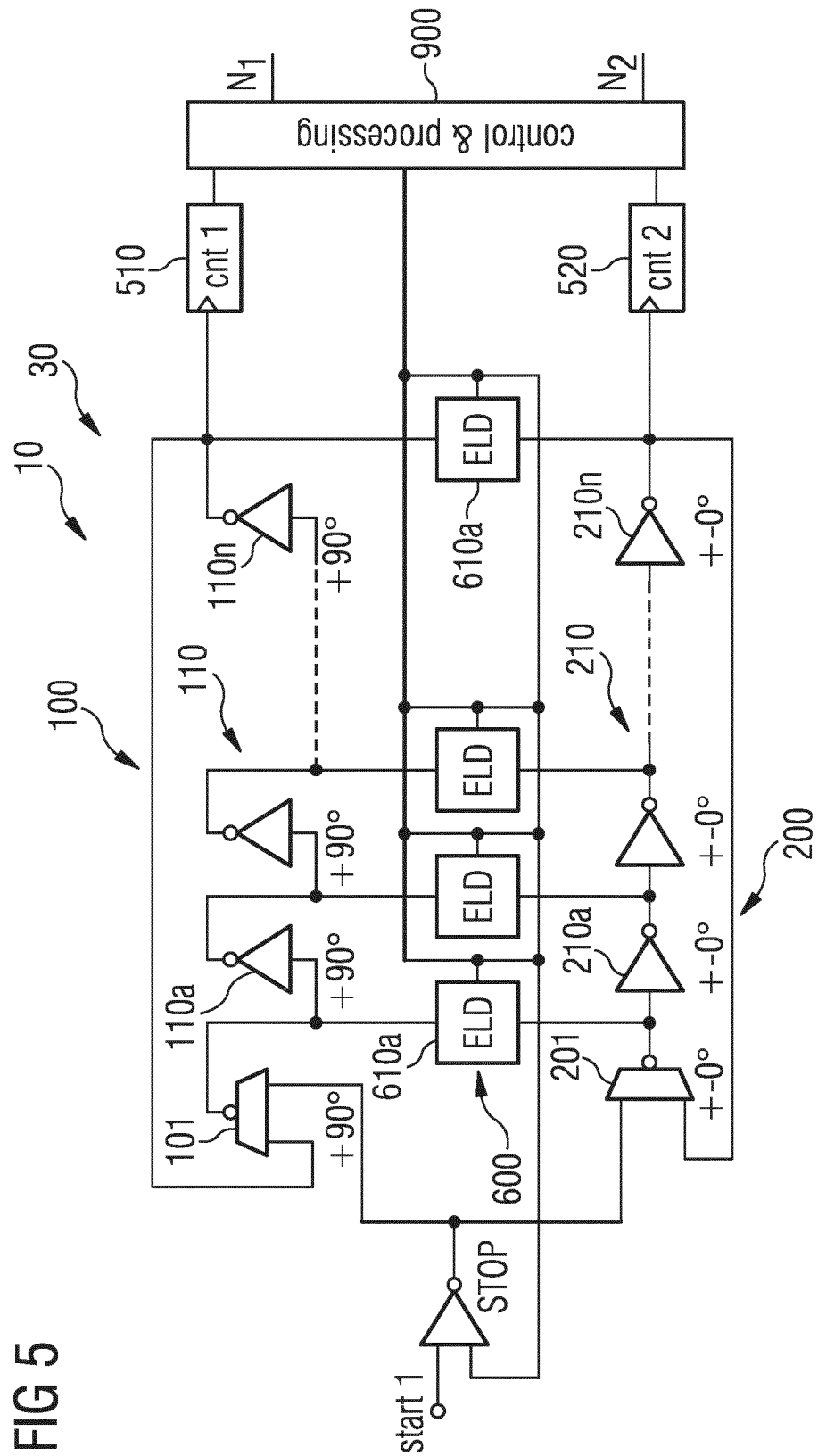
FIG. 5 shows a third embodiment of an electric circuitry for strain measurement using ring oscillators.

FIGS. 2B, 3 and 5 show different embodiments of an electric circuitry 10 for strain measurement comprising at least a first ring oscillator 100 including the first delay chain 110, and at least a second ring oscillator 200 including the second delay chain 210. The first and second ring oscillators 100 and 200 are arranged on the substrate 30, for example a silicon substrate, in different orientations. The at least one first ring oscillator 100 has a first oscillation frequency being dependent on the direction of a strain applied on the substrate 30. The at least one second ring oscillator 200 has a second oscillation frequency being dependent on the direction of the strain applied on the substrate 30. The electric circuitry 10 further comprises the processing circuit 900 to determine a magnitude of the strain applied on the substrate 30 in dependence on the first and second oscillation frequencies.

As shown in FIGS. 2B, 3 and 5, the at least one first ring oscillator 100 comprises the first delay chain 110 of the plurality of delay elements/gates 110a, . . . , 110n, and the second ring oscillator 200 comprises the second delay chain 210 of the plurality of delay elements/gates 210a, . . . , 210n. The propagation delay time of the respective delay elements 110a, . . . , 110n and 210a, . . . , 210n of the at least one first and second ring oscillator 100, 200 are dependent on the strain applied to the substrate 30. The at least one first and second ring oscillator 100 and 200 are arranged on the substrate 30 such that the delay elements/gates 110a, . . . , 110n of the at least one first ring oscillator 100 have orientation other than the delay elements 210a, . . . , 210n of the at least one second ring oscillator 200.

In the embodiments of the electric circuitry 10 for strain measurement shown in FIGS. 2B, 3 and 5, the ring oscillators 100 and 200 may be oriented perpendicular to each other. In particular, the delay elements 110a, . . . , 110n of the at least one first ring oscillator 100 and the delay elements 210a, . . . , 210n of the at least one second ring oscillator 200 may be oriented perpendicular to each other. It has to be noted that the orientation on the wafer may not be fixed, just the angle between. Therefore, in the figures, just a relative angle (±0°, +90°) is denoted. This means that the delay elements/gates in the at least one first ring oscillator 100 orientated, for example, in [110] orientation of the wafer whereas the delay elements 210a, . . . , 210n of the at least one second ring oscillator 200 are orientated, for example, in [−110] orientation of the wafer.

However, it has to be noted that also any other direction of the wafer is valid, as long as the angle between the ring oscillators is 90°. Furthermore, it should be noted that the alignment of the delay element of the first and second delay chain 110, 210 with an angular offset of 90° between the ring oscillators 100 and 200 is not mandatory. The decisive factor is that the respective delay elements in the ring oscillators 100 and 200 are arranged in different directions on the substrate 30.

As shown in the embodiments of the electric circuitry 10 for strain measurement in FIGS. 2B and 5, the at least one first and second ring oscillators 100 and 200 are started in common at the same time.

Referring to the embodiments of the electric circuitry 10 for strain measurement illustrated in FIGS. 2B and 3, each of the electric circuitries comprises a time-to-digital converter/TDC 300 having a ring oscillator 301. The ring oscillator 301 comprises delay elements/gates 310a, . . . , 310n being subsequently arranged in a chain as shown in FIGS. 2B and 3. The time-to-digital converter 300 may be configured as a looped time-to-digital converter. However, any other configuration of the time-to-digital converter 300 is possible. The ring oscillator 301 of the time-to-digital converter has an output side O301 to generate an output signal of the ring oscillator 301 in response to a state of the ring oscillator 301 of the time-to-digital converter 300.

Referring to FIGS. 2B and 3, the processing circuit goo is configured to determine the magnitude of the strain applied on the substrate 30 in dependence on a ratio between a first value N1 representing a first decoded state of the ring oscillator 301 of the time-to-digital converter 300 detected at a first time, and a second value N2 representing a second decoded state of the ring oscillator 301 of the time-to-digital converter 300 detected at a second time.

The first time is determined by the period duration of the at least one first ring oscillator 100. The period duration of the at least one first ring oscillator 100 is dependent on the propagation delay time of the delay elements 110a, . . . , 110n of the at least one first ring oscillator 100. The period duration of the at least one first ring oscillator 100 may specify the time being necessary for a signal to propagate through the complete chain of delay elements 110a, . . . , 110n. The period duration of the at least one first ring oscillator 100 may specify the time being necessary for a signal to propagate two times through the complete chain of delay elements 110a, . . . , 110n.

The second time is determined by the period duration of the at least one second ring oscillator 200. The period duration of the at least one second ring oscillator 200 is dependent on the propagation delay time of the delay elements 210a, . . . , 210n of the at least one second ring oscillator 200. The period duration of the at least one second ring oscillator 200 may specify the time being necessary for a signal to propagate through the complete chain of delay elements 210a, . . . , 210n. The period duration of the at least one second ring oscillator 200 may specify the time being necessary for a signal to propagate two times through the complete chain 210 of delay elements 210a, . . . , 210n.

Referring to the embodiment of the electric circuitry 10 shown in FIG. 2B, the electric circuitry for strain measurement comprises at least one first storage circuit 410 to store the first state of the ring oscillator 301 of the time-to-digital converter 300. The storing of the first state of the ring oscillator 301 is controlled by the at least one first ring oscillator 100. The electric circuitry further comprises at least one second storage circuit 420 to store the second state of the ring oscillator 301 of the time-to-digital converter 300. The storing of the second state of the ring oscillator 301 is controlled by the at least one second ring oscillator 200.

The time-to-digital converter 300 of FIGS. 2B and 3 comprises a counter 320 to provide a counting value that is stored in one of the storage circuits 410 and 420 and which represents a state of the time-to-digital converter 300. The storage circuits 410 and 420 may be configured as sample and hold elements.

The circuit configuration of the electric circuitry 10 of FIG. 2B is characterized by the different orientation, for example a perpendicular orientation, of the ring oscillators 100 and 200 on the substrate 30. Both ring oscillators are started at the same time. The results of the processing circuit 900 specifying the magnitude of strain applied to the substrate 30 are proportional to a ratio of TDC counts N1 and N2. The electric circuitry 10 is further characterized by the elimination of the strain dependency of the TDC ring oscillator 301, because the circuit performs a strain measurement by a ratiometric evaluation of the values N1 and N2.

The electric circuitry 10 of the embodiment shown in FIG. 2B has ring oscillators 100 and 200 as time basis. The electric circuitry 10 has two channels with a storage circuit 410 and a storage circuit 420, each are tapped to the TDC ring oscillator 301. The TDC ring oscillator 301 has an own enable signal EN to start or stop the oscillation. This is important to reach lowest current consumption when no measurement is done. The period of the ring oscillators 100 and 200 oriented in a different angle to each other on the substrate may be pre-processed by divider elements 800, for example doubled by counting out every second pulse with the divider 800. The respective divider elements 800 may be connected between the respective ring oscillators and the storage circuits 410 and 420. The strain-dependent ring oscillators 100 and 200 trigger the storage stage of the storage circuits/sample and hold elements 410 and 420 of one channel. The period of the strained ring oscillator frequency is the sum of all propagation delays of the delay elements/gates, for example the propagation delays of all rising and falling edges of the delay elements/gates, in the ring oscillator chain.

The storage stage comprising the storage circuits 410 and 420 is set up to measure the period of the connected ring oscillator. According to a possible embodiment, each stage sample the TDC count of two clock pulses of the applied strained ring oscillator clock. The difference of both TDC counts of the two clock pulses is then the TDC measurement of period of the strained ring oscillator.

Time basis for quantization is the propagation delay of the delay elements/gates in the TDC ring oscillator 301. The following processing unit goo is able to calculate the values N1 and N2 representing the current period of each ring oscillator 100 and 200 or representing the first and second decoded state of the ring oscillator 301 of the time-to-digital converter 300.

FIG. 3 shows a second embodiment of the electric circuitry 10 for strain measurement with ring oscillators 100 and 200, which is a variation of the first embodiment of the electric circuitry 10 shown in FIG. 2A. The electric circuitry 10 of FIG. 3 comprises a time-to-digital converter with only one channel for time measurement. According to the embodiment of the electric circuitry 10 shown in FIG. 3, the electric circuitry 10 just comprises one TDC channel and one storage circuit 400, for example a sample and hold element.

In particular, the electric circuitry 10 shown in FIG. 3 comprises a storage circuit 400 to store the first and second state of the ring oscillator 301 of the time-to-digital converter 300. The storing of the first and second state of the ring oscillator 301 of the time-to-digital converter 300 is controlled by the at least one first and second ring oscillators 100 and 200. Both strain-dependent ring oscillators 100 and 200 are measured one after the other. Therefore, both ring oscillators 100 and 200 have individual start signals start1, start2.

The electric circuitry 10 comprises a logic gate/multiplexer 700 to select the activated ring oscillator 100 and 200 to be connected to the subsequent storage circuit 400. The multiplexer 700 is arranged between a control input node C400 of the storage circuit 400 to apply a control signal to control the storing of the first and second state of the ring oscillator 301 of the time-to-digital converter 300, and a respective output side O100, O200 of the at least one first ring oscillator 100 to generate a first output signal and the at least one second ring oscillator 200 to generate a second output signal.

The multiplexer/logic gate 700 is configured to control the storing of the first and second state of the ring oscillator 301 so that the first state of the ring oscillator 301 of the time-to-digital converter 300 is stored in the storage circuit 400 in dependence on the first output signal of the at least one first ring oscillator 100 at the first time. The output signal of the at least one first ring oscillator 100 is dependent on the period duration of the at least one first oscillator, i.e. the signal propagation delay time through the delay elements 110a, . . . , 110n of the at least one first ring oscillator.

The multiplexer/logic gate 700 is configured to control the storing of the first and second state of the ring oscillator 301 so that the second state of the ring oscillator 301 of the time-to-digital converter 300 is stored in the storage circuit 400 in dependence on the second output signal of the at least one second ring oscillator 200 at the second time being subsequent to the first time. The output signal of the at least one second ring oscillator 200 is dependent on the period duration of the at least one second oscillator, i.e. the signal propagation delay time through the delay elements 210a, . . . , 210n of the at least one second ring oscillator.

The approach of the electric circuitry 10 for strain measurement shown in FIG. 3 lowers the gate count and therefore the implementation area of the dice at the expense of lower suppression of temperature, voltage, process, and strain in the TDC ring oscillator. Due to the fast measurement cycles with a time-to-digital converter in the range of several MSPS (Mega Samples per Second), this approach is also feasible as the variations in voltage, temperature, process or strain are considered much slower.

Figure 4A:
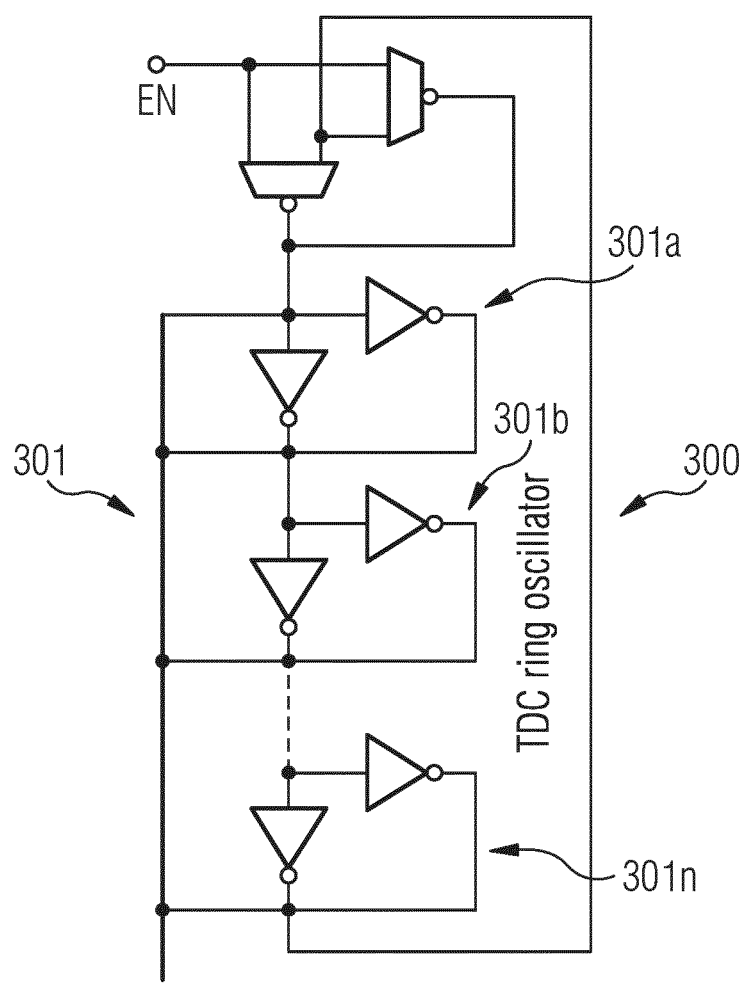
FIGS. 4A and 4B show different realizations of ring oscillator of a time-to-digital converter to provide strain-insensitive time basis for an electric circuitry for strain measurement.
Figure 4B:
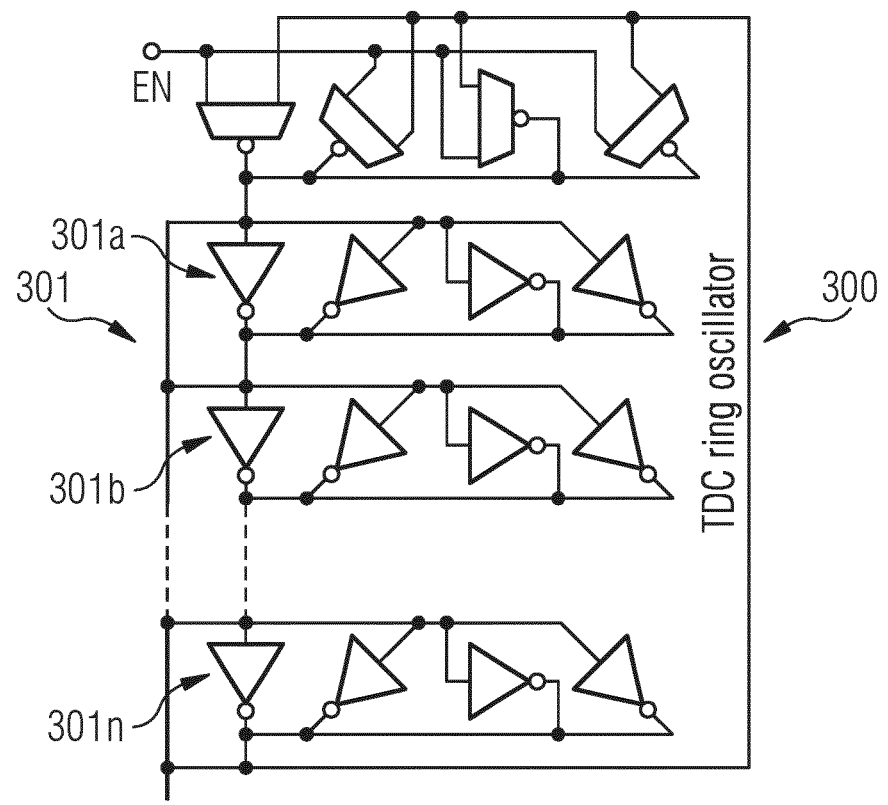

Regarding the embodiments shown in FIGS. 2B and 3, the time basis in the time-to-digital converter 300 should be less sensitive to strain and the sensing ring oscillators. FIGS. 4A and 4B show two possible configurations of the time-to-digital converter 300 to provide a strain-insensitive time basis. As explained above, it is known that the variation of the ring oscillator period is dependent on the orientation of the respective delay elements of the ring oscillator on the substrate/dice.

Especially in perpendicular ring oscillators, as shown in FIG. 4A, the variation may have the opposite direction. Therefore, the delay elements/gates of the ring oscillator 301 may be advantageously arranged in several orientations and are connected in parallel.

The ring oscillator 301 may comprise a plurality of delay stages 301a, . . . , 301n. Each delay stage comprises at least two delay elements being connected parallel to each other, wherein the respective delay elements of each delay stage 301a, . . . , 301n are arranged on the substrate 30 in a different orientation. In particular, FIG. 4A shows delay elements of each delay stage 301a, . . . , 301 n being arranged perpendicular to each other in a parallel configuration. FIG. 4B shows in each delay stage 301a, . . . , 301n a parallel configuration of the delay elements, wherein the delay elements are arranged in several orientations. According to a possible embodiment, at least two of the shown four delay elements may be arranged perpendicular to each other.

The orientation of the parallel connected delay elements of FIGS. 4A and 4B enables to average out the strain dependency of the time-to-digital converter 300 up to a certain extent. With more than two orientations, such as is shown in FIG. 4B, the suppression rate will further improve.

FIG. 5 shows a third embodiment of an electric circuitry 10 for strain measurement comprising ring oscillators 100 and 200. The electric circuitry 10 is configured as a so-called Vernier TDC with perpendicular orientated ring oscillators 100 and 200. The perpendicular orientated ring oscillators 100 and 200 comprise delay elements/gates 110a, . . . , 110n and 210a, . . . , 210n, where the delay elements 110a, . . . , 110n of the at least one first ring oscillator 100 and the delay elements 210a, . . . , 210n of the at least one second ring oscillator 200 are oriented perpendicular to each other. As explained above, the perpendicular alignment of the delay elements of the first and second ring oscillator 100, 200 is not mandatory. The important factor is that the respective delay elements in the ring oscillators 100 and 200 are arranged in different directions on the substrate 30. Both ring oscillators 100 and 200 are started by a common start signal start.

The electric circuitry 10 shown in FIG. 5 comprises a first counter circuit 510 being arranged between the at least one first ring oscillator 100 and the processing circuit goo to count a first number of complete signal runs through the at least one first ring oscillator 100 between application of a start signal to the at least one first ring oscillator 100 to start the at least one first ring oscillator and application of a stop signal to the at least one first ring oscillator 100 to stop the at least one first ring oscillator. The electric circuitry 100 comprises a second counter circuit 520 being arranged between the at least one second ring oscillator 200 and the processing circuit goo to count a second number of complete signal runs through the at least one second ring oscillator 200 between application of the start signal to the at least one second ring oscillator 200 to start the at least one second ring oscillator and application of the stop signal to the at least one second ring oscillator 200 to stop the at least one second ring oscillator.

According to the embodiment of the electric circuitry 10 for strain measurement shown in FIG. 5, the electric circuitry comprises a chain 600 of Early-Late Detector units 610a, ..., 610n to detect a state of the at least one first and second ring oscillators 100, 200. Each of the Early-Late Detector units 610a, ..., 610n is coupled to a respective one of the delay elements 110a, ..., 110n of the at least one first ring oscillator 100 and a respective one of the delay elements 210a, ..., 210n of the at least one second ring oscillator 200. The chain 600 of the Early-Late-Detector units 610a, ..., 610n is embodied such that at least one of the Early-Late-Detector units 610a, ..., 610n generates the stop signal, if said one of the Early-Late-Detector units 610a, ..., 610n detects that the respective one of the delay elements 110a, ..., 110n of the at least one first ring oscillator 100 connected to said one of the Early-Late-Detector units and the respective one of the delay elements 210a, ..., 210n of the at least one second ring oscillator 200 connected to said one of the Early-Late-Detector units change its respective state at the same time.

The processing circuit goo is configured to determine a first value N1 representing the number of complete signal runs through the at least one first ring oscillator 100 past between application of the start and the stop signal, and a current state of the at least one first ring oscillator 100 detected by the chain 600 of Early-Late-Detector units 610a, ..., 610n. The processing circuit 900 is further configured to determine a second value N2 representing the number of complete signal runs through the at least one second ring oscillator 200 past between application of the start and the stop signal, and a current state of the at least one second ring oscillator 200 detected by the chain 600 of Early-Late-Detector units 610a, ..., 610n. The processing circuit 900 is configured to determine the magnitude of the strain applied on the substrate 30 in dependence on a ratio of the first value N1 and the second value N2. Results N1 and N2 quantizise or quantify same time period with different strain dependent resolution.

The approach shown in FIG. 5 is based on a so-called Vernier TDC with strain-dependent ring oscillators 100 and 200. The chain of the Early-Late-Detector units will indicate when delay elements in the ring oscillators 100 and 200 are switching in phase and will also stop the ring oscillators 100 and 200. A common stop signal for the ring oscillators 100 and 200 is triggered by one of the elements of the Early-Late-Detector units 610a, ..., 610n. Some modifications of the design, for example applying the respective stop signal of each Early-Late-Detector unit 601a, ..., 610n to one of the delay elements of the first ring oscillator 100 and to one of the delay elements of the second ring oscillator 200 as well as applying a start signal to a first gate coupled to the first ring oscillator and to a second gate coupled to the second ring oscillator, are possible.

Due to the applied strain one of the ring oscillators 100 and 200 may switch their delay elements slightly slower or faster than the other orthogonal orientated ring oscillator. Both ring oscillators are started and stopped in common, but as the delays, and therefore the periods, were different due to the applied strain, the first value N1 and the second value N2 of past delay elements in each ring oscillator is different.

Since the temperature sensitivity in temperature and voltage, as well as the dependency on process variations of both oscillators 100 and 200 are substantially identical, the influence of temperature, voltage or process of the measurement can be considerably reduced by determining the ratio of the two TDC counts N1 and N2.

Referring to the embodiments of the electric circuitry 10 shown in FIGS. 2B, 3 and 5, the application of strain-dependent ring oscillators having different angular orientation of their delay elements has several advantages. In case a ring oscillator does have a period of 1000 ns (nanoseconds), applied strain in a package would vary this period at a maximum by 4 ns. With the speed and resolution of state of the art time-to-digital converter with, for example, a resolution of 10 ps (picoseconds), it is possible to subdivide these 4 ns into 400 division or 8.6 Bit.

TDC combines high resolution in time in combination also with fast conversion time of few nanoseconds. For this reason, ring oscillator-based TDC like tapped ring oscillators, as shown in the embodiments of FIGS. 2 and 3, or Vernier TDC, as shown in the embodiment of FIG. 5, are preferred for the electric circuitry 10 for strain measurement over frequency counter. Typical for both types of TDC is that they also apply ring oscillators where the timing driving elements are based on the propagation delay of digital gates.

Because of fast measurement there is a possibility to average several results and therefore to increase the resolution of the results. TDC resolves the resolution of a propagation delay of, for example, 50 ps or even lower with sub-gate resolution techniques. The fast measuring speed also enables the possibility to measure out several ring oscillators and combine the results for compensation purposes.

Typically, the propagation delay of the gates/inverters in the ring oscillators is a quantization ISB of the TDC. In line with the proposed electric circuitry 10 for strain measurement, this timing element is also integrated on the same substrate and is underlying the same strain. This dependency has to be compensated. One of the gates in the ring oscillator is typically a gate, which enables or disables the ring oscillator. With this gate and because of fast conversions, it is in many applications possible not to measure all the time. The current consumption can therefore decrease significantly by switching off all ring oscillators in dead time.

Regarding the approaches of electric circuitries for strain measurement, it is pointed out that in all embodiments, it is possible to switch off the operation current completely, because the ring oscillators incorporate an enable/disable gate 101, 201 or 1001, 2001. By operating this gate in applications, average current consumption of only a few microamperes are possible.

Time resolution of TDC is in picosecond range, time resolution of counters is in nanosecond range. Therefore, measurement with frequency counters are much slower, for example one hundred times slower. This will limit the resolution, increase the current consumption and also reduce the suppression of voltage and temperature and possibly of strain effects.

FIG. 6 illustrates examples possible orientations of gates/delay elements of the ring oscillator on a substrate of a standard wafer with 001 plane. A gate, in this example an inverter, denoted with ±0° does have the current in drain-source direction into the (110) direction of the wafer.

Figure 7A:
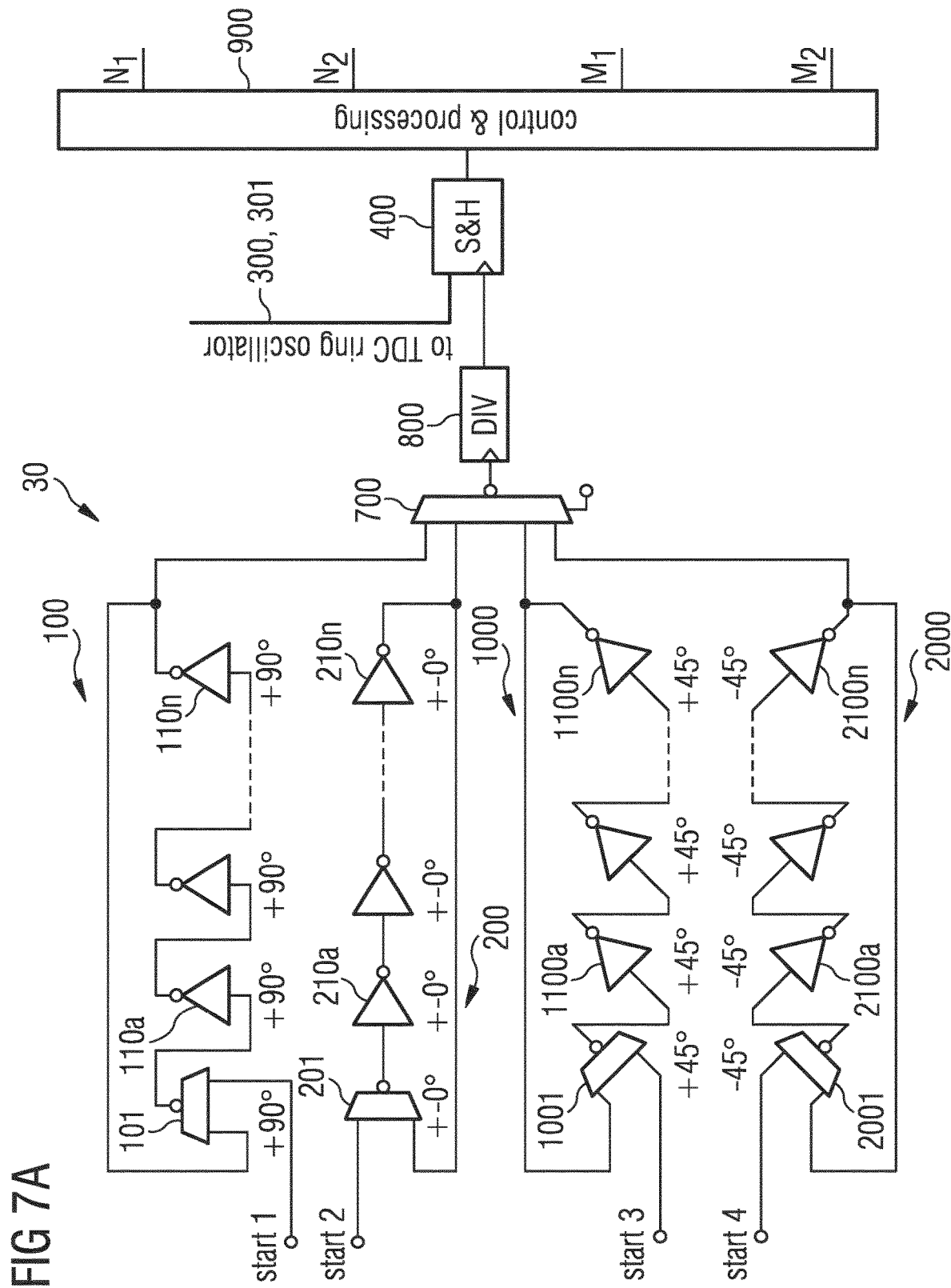
FIG. 7A shows an embodiment of an electric circuitry with four ring oscillators for plane strain analysis.
Figure 7B:
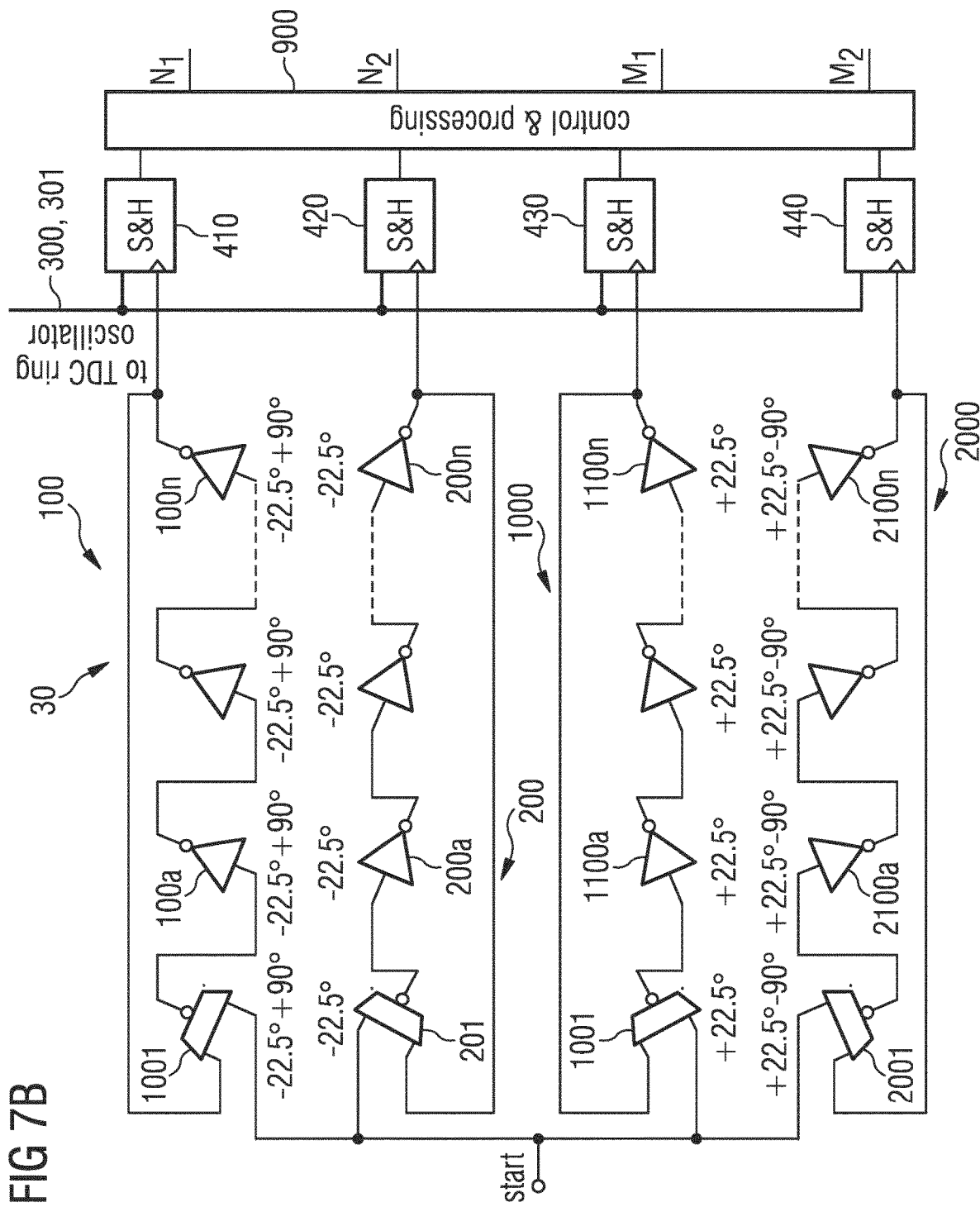
FIG. 7B shows another embodiment of an electric circuitry with four ring oscillators for plane strain analysis.

FIGS. 7A and 7B illustrate configurations of the electric circuitry 10 for strain measurement which may be used for plane strain analysis. According to a possible embodiment, at least three, but preferably four, ring oscillators and a time-to-digital converter are provided for the purpose of plane strain analysis. The embodiments shown in FIGS. 7A and 7B of the electric circuitry 10 comprise four strain dependent ring oscillators 100, 200, 1000, 2000 comprising respective delay elements.

The ring oscillator 100 comprises the delay elements 110a, . . . , 110n, and the ring oscillator 200 comprises the delay elements 210a, . . . , 210n being arranged perpendicular to each other on the substrate. The ring oscillator 1000 comprises delay elements 1100a, . . . , 100n, and the ring oscillator 2000 comprises delay elements 2100a, . . . , 2100n being arranged perpendicular to each other on the substrate. As explained above, other different angular orientations of the delay elements to each other are possible.

According to the embodiment shown in FIG. 7A, the delay elements 110a, . . . , 110n are arranged in a 90° direction, and the delay elements 210a, . . . , 210n are oriented in a ±0° direction. Regarding the ring oscillators 1000 and 2000, the delay elements 1100a, . . . , 1100n are oriented in a +45° direction and the delay elements 2100a, . . . , 2100n are oriented in a −45° orientation. The other elements of the electric circuitry 10 of FIG. 7A correspond to the configuration of the electric circuitry 10 shown in FIG. 3. The ring oscillators 100, 200, 1000 and 2000 are connected to one time-to-digital converter 300. The ring oscillators are aligned to each other in a 0° and 45° orientation and the respective orthogonal orientation. According to the symmetry, the ring oscillators are orientated parallel to the main crystal planes of [110], [−110], [100], and [010]. The electronic behaviour of the ring oscillators 100, 200 and 1000, 2000 are pairwise the same due to the symmetries of the standard wafer material.

Regarding the embodiment of the electric circuitry 10 of FIG. 7B, the delay elements of the ring oscillators 100 and 200 are oriented in a direction of −22.5°+90° and −22.5° The delay elements of the ring oscillators 1000 and 2000 are oriented in a direction of +22.5°-90° and +22.5°. Each of the ring oscillators 100, 200 and 1000, 2000 are connected to a respective storage circuit/sample and hold element 410, 420, 430 and 440. The storage circuits 410, . . . , 440 are connected to the processing unit 900 to calculate the values/counts N1, N2 and M1, M2 of the respective ring oscillators.

In comparison to the embodiment of the electric circuitry 10 of FIG. 7A, the further embodiment of the electric circuitry 10 shown in FIG. 7B uses an angular orientation for the delay elements being rotated in relation to the previous arrangement of FIG. 7A of the ring oscillators by 22.5° and orthogonal. This angular orientation corresponds to the [2-10], [210], [120] and [−120] lattice orientation on standard (001) wafers. In this case, the electronic behaviour of each ring oscillator 100, 200, 1000, 2000 is identical because of the symmetry in the wafer material which leads to better suppression of PVT variations. In the embodiment of the electric circuitry 10 shown in FIG. 7B, each ring oscillator 100, 200, 1000, 2000 is connected to an own TDC channel and has as a common start signal. This promises high suppression of voltage temperature and common strain in TDC when calculating the strain measurement.

It has to be noted that plane strain analysis may also be performed using an approach that is adapted with three ring oscillators, for example in a 120° angular distribution. Nevertheless, the approach shown in FIGS. 7A and 7B using four ring oscillators is the preferred one due to the symmetry on the wafer and the package.

FIG. 8 shows an embodiment of an electric circuitry 10 for strain measurement having a compensation of remaining temperature effects after ratiometric compensation. The electric circuitry comprises ring oscillators 100 and 200 comprising respective delay elements orientated perpendicular to each other as well as ring oscillators 1000 and 2000 comprising respective delay elements orientated perpendicular to each other. Each of the ring oscillators is connected to an own TDC channel comprising storage circuits 410, 420, 430 and 440 which are connected to the processing unit 900.

The piezoelectric coefficients are known to be temperature-dependent in a different manner on the channel width W or channel length L in NMOS and PMOS transistors of the delay elements. In the approach shown in FIG. 8, the channel varies only in channel width W of NMOS and PMOS transistors.

In particular, the electric circuitry 10 comprises a first set of strain-dependent ring oscillators 100 and 200 with a channel width of W1N of NMOS and W1P of PMOS transistors of the respective delay elements with ratio W1N/W1P. Furthermore, the electric circuitry 10 shown in FIG. 8 comprises a second set of strain-dependent ring oscillators 1000, 2000 in the same orientation as before but with a width of W2N of NMOS and W2P of PMOS transistors of the respective delay elements with ratio W2N/W2P being different to W1N/W1P. This difference in WN, WP will result in different temperature drift, which can then be used to compensate temperature drifts remaining despite the ratiometric measurement, for example by adding a weighted sum of both results. With an arrangement for plane strain analysis with initially four strain-dependent ring oscillators, it may be necessary to apply additional four strain-dependent ring oscillators with different WN/WP for this purpose.

It has been found that the electric circuitry 10 may also be used to detect compressive or tensile strain applied to a substrate. Strain can be applied by bending an axis of the substrate, for example by applying compressive strain on the 0° axis or orthogonal with tensile strain at the 90° axis of the substrate. In both cases the TDC measurements of the strain-dependent ring oscillator periods have the same sign, in spite of the two axes where the strain is applied. Just with the ratio of the two measurement counts N1 and N2 of the two ring oscillators, it is impossible to detect the direction where the strain is applied.

Experiments have shown that typically the TDC measurement of the ring oscillator pointing into the direction of the strain, for example the ring oscillator having the 0° orientation with compressive strain in the 0° direction is slightly higher than the TDC measurement of the ring oscillator pointing orthogonal to the direction of the strain, for example the ring oscillator having the 90° orientation with compressive strain in the 0° direction. By comparing the results obtained from the perpendicular arranged ring oscillators, it is possible to distinguish tensile or compressive strain, even if the direction of the strain is unknown. The two axes and two strain types cause four characteristic and detectable types of strain. In particular, the sign and size of the measurement amplitude of both ring oscillators make it possible to distinguish between all four cases.

When considering a monolithic integrated chip it is always possible to apply more delay chains as shown in FIG. 2A, or ring oscillators as shown in FIGS. 2B, 3, 5, 7A, 7B and 8. Furthermore, it is possible to provide an array of electric circuitries 10 for strain measurement. With this additional information obtained from the several ring oscillators or the various electric circuitries 10, it is possible to further detect gradients in the strain caused, for example, by torsion of the chip.

Figure 9:
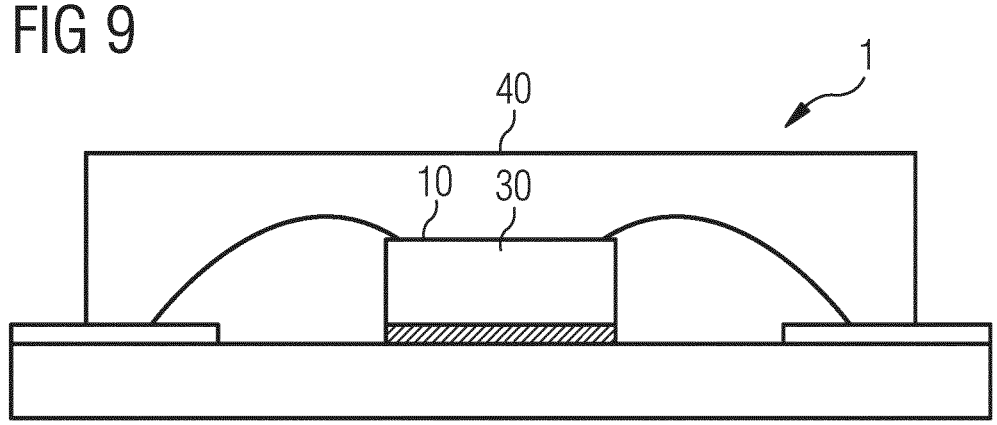
FIG. 9 shows a sensor device comprising an electric circuitry for strain measurement.

FIG. 9 illustrates an embodiment of a sensor device 1 comprising the electric circuitry 10 for strain measurement. The electric circuitry 10 of the sensor device 1 is embodied to measure the magnitude and/or the direction of the strain and/or gradients of the strain applied on the substrate 30. The electric circuitry 10 is encapsulated in a housing 40.

Figure 10:
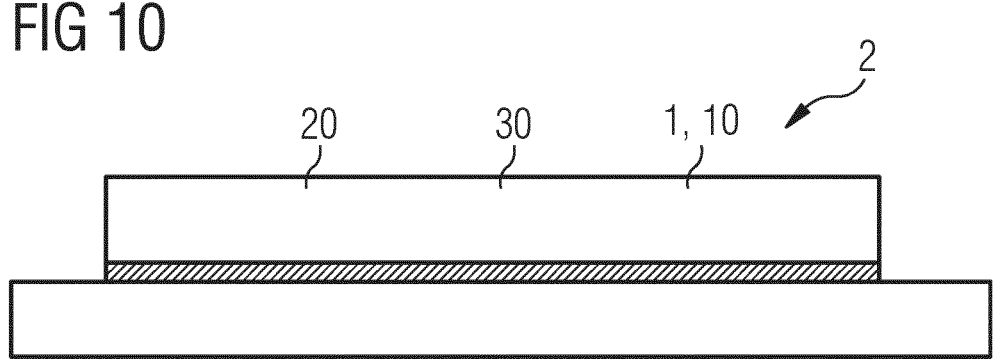
FIG. 10 illustrates an electronic device comprising an electric circuitry for strain measurement and an additional electric circuitry being monolithically integrated in the same substrate.

FIG. 10 shows an embodiment of an electronic device 2 comprising a sensor device 1 which includes the electric circuitry 10 for strain measurement and another electric circuitry 20 which are both monolithically integrated in the substrate 30.

FIG. 11 shows an embodiment of a sensor arrangement of comprising a plurality of the sensor device 1a, 1b, . . . , 1n. According to an advantageous embodiment, the sensor devices 1 are connected to each other in a Daisy Chain configuration.

The strain sensing is typically limited to area of the chip itself. Many application will need die detection of strain state in a larger area. Typical applications are the analysis of strain on a whole PCB, the replacement of buttons of a keyboard, strain state of any kind of sitting or laying areas, strain and bending measurement in walking shoes, etc.

For these kind applications at least several devices, but also on a large scale several dozens of devices are necessary. A processor or controller has to operate all these devices. For example on a SPI protocol each device has an own selection line with results in dozens of additional pins needed on side of the processor or controller. For example on a I2C protocol, each device needs an exclusive bus address. This means in any case an exclusively handling for each device in order to assign an individual address. Further, specific in I2C protocol the range of useable device addresses is limited.

The solution to overcome this problem is the connection of all devices in a daisy chain, as shown in FIG. 11. The complete bus or parts of the bus is looped trough each device. All devices are connected to serial chain. Each device is connected in same manner to the neighboring chip at left and right side.

Specific advantage of the daisy chain connection are the use of the same circuit for each sensor node/device as well as the same bonding of the chip in the housing or PCB. Furthermore, in case of cable connected PCBs, each PCB is identical. A controller needs only resources like pins or bus addresses to communicate with a single device.

The various embodiments of the electric circuitry 10 may be used for strain measurement in a plurality of fields of applications. The electric circuitry 10 for strain measurement may be used, for example, in the field of mobile phones, PCs, notebooks or pads for forced press detection, deep press detection, hands-on detection or damage recording on PCB, housing, etc. Furthermore, the electric circuitry 10 may be applied in industrial applications for the digital replacement of strain gauge, for digital torque sensing, mechanical stress sensing and analytics, for enabling sensory robots for force and grip, and weight sensing. Moreover, the electric circuitry 10 may be used in a force or bend activated switch (trigger level determined) or in force sensory for clips, attachments, etc. Furthermore, the electric circuitry 10 may be used in process and product monitoring and analytics. An array of electric circuitries 10 may be used as a sensor which enables a 2D- and 3D-recording and analytics of mechanical stress.

Another application field is home appliances, where the electric circuitry 10 can be used as a fill level sensory for a kitchen appliance (coffee maker, soap dispenser etc.). In the field of renewable energy the electric circuitry 10 for strain measurement may be used for wireless monitoring of wind power installation or water turbine monitoring and diagnostic. In the field of health, the electric circuitry 10 may be used for health monitoring purposes or analytics, as intelligent sensory in clothes and fabrics, as a sensor device in shoes or socks or as a sensory E-toothbrush to limit excessive force on teeth. In the field of sports/wearables, the electric circuitry 10 may be used as force and bending sensory equipment. Generic features are that the devices can be NFC powered and operated by ultra-low power. All devices generate data for artificial intelligence analytics.

Moreover, the electric circuitry 10 for strain measurement may be applied in the general field of image sensors to provide bending control of curved image sensors or thickness control of backside illuminated thin wafers. In particular, in the field of curved image sensors, the electric circuitry 10 for strain measurement enables smaller form factors of lenses, provides measurement of local or global bending in curved image sensors, improvement of the process and may be used as a basis for additional compensation measures of, for example, focus.

Although the invention has been illustrated and described in detail by means of the preferred embodiment examples, the present invention is not restricted by the disclosed examples and other variations may be derived by the skilled person without exceeding the scope of protection of the invention.

The invention claimed is:
1. An electric circuitry comprising:
at least one first ring oscillator and at least one second ring oscillator being arranged on a substrate in different orientations;
a time-to-digital converter having a converter ring oscillator; and
a processing circuit,
wherein the at least one first ring oscillator comprises at least one first delay chain and the at least one second ring oscillator comprises at least one second delay chain,
wherein the at least one first delay chain of a plurality of delay elements and the at least one second delay chain of a plurality of delay elements are arranged on the substrate,
wherein the respective delay elements of the at least one first and second delay chains are configured to provide a propagation delay time depending on strain applied to the substrate,
wherein the delay elements of the at least one first delay chain have other orientations on the substrate than the delay elements of the at least one second delay chain,
wherein the at least one first ring oscillator is configured to operate with a first oscillation frequency and the at least one second ring oscillator is configured to operate with a second oscillation frequency, wherein the converter ring oscillator has an output side configured to provide an output signal of the converter ring oscillator based on a state of the converter ring oscillator, wherein a first time is determined by a period duration of the at least one first ring oscillator, the period duration of the at least one first ring oscillator being dependent on the propagation delay time of the delay elements of the at least one first ring oscillator, wherein a second time is determined by a period duration of the at least one second ring oscillator, the period duration of the at least one second ring oscillator being dependent on the propagation delay time of the delay elements of the at least one second ring oscillator, and wherein the processing circuit is configured to determine a magnitude of the strain applied on the substrate based on a first state of the converter ring oscillator at the first time and a second state of the converter ring oscillator at the second time.

2. The electric circuitry of claim 1, wherein a respective oscillation of the at least one first and second ring oscillators is started by individual start signals.

3. The electric circuitry of claim 1, wherein the processing circuit is configured to determine the magnitude of the strain applied on the substrate based on a ratio between a first value representing a first decoded state of the converter ring oscillator detected at the first time and a second value representing a second decoded state of the converter ring oscillator detected at the second time.

4. The electric circuitry of claim 3, further comprising:
at least one first storage circuit configured to store the first state of the converter ring oscillator, wherein the at least one first ring oscillator is configured to control storing of the first state; and
at least one second storage circuit configured to store the second state of the converter ring oscillator, wherein the at least one second ring oscillator is configured to control storing of the second state.

5. The electric circuitry of claim 1, further comprising a storage circuit configured to store the first state and the second state of the converter ring oscillator, wherein the at least one first and second ring oscillators are configured to control storing of the first and second state of the converter ring oscillator.

6. The electric circuitry of claim 5, further comprising:
a multiplexer or a logic gate arranged between a control input node of the storage circuit and configured to control the storing of the first and second state of the converter ring oscillator; and
a respective output side of at least one first ring oscillator configured to provide a first output signal and at least one second ring oscillator configured to provide a second output signal,
wherein the multiplexer or the logic gate is configured to control the storing of the first and second state of the converter ring oscillator so that the first state of the converter ring oscillator is stored in the storage circuit depending on the first output signal of the at least one first ring oscillator at the first time, and
wherein the multiplexer or the logic gate is configured to control the storing of the first and second state of the converter ring oscillator so that the second state of the converter ring oscillator is stored in the storage circuit depending on the second output signal of the at least one second ring oscillator at the second time being subsequent to the first time.

7. The electric circuitry of claim 1, wherein the at least one first and second ring oscillators are configured to start in common at the same time.

8. A sensor device comprising:
the electric circuitry of claim 1, wherein the electric circuitry of the sensor device is configured to measure the magnitude and/or a direction of the strain and/or a gradient of the strain applied on the substrate; and
a housing encapsulating the electric circuitry.

9. An electronic device comprising:
the sensor device of claim 8; and
a further electronic circuitry,
wherein the electric circuitry for strain measurement and the further electronic circuitry are monolithically integrated in the substrate.

10. A sensor arrangement comprising:
a plurality of the sensor devices of claim 8, wherein the sensor devices are connected to each other in a daisy chain configuration.

11. An electric circuitry comprising:
at least one first ring oscillator and at least one second ring oscillator being arranged on a substrate in different orientations;
a first counter circuit;
a second counter circuit; and
a processing circuit,
wherein the at least one first ring oscillator comprises at least one first delay chain and the at least one second ring oscillator comprises at least one second delay chain,
wherein the at least one first delay chain of a plurality of delay elements and the at least one second delay chain of a plurality of delay elements are arranged on the substrate,
wherein the respective delay elements of the at least one first and second delay chains are configured to provide a propagation delay time depending on strain applied to the substrate,
wherein the delay elements of the at least one first delay chain have other orientations on the substrate than the delay elements of the at least one second delay chain,
wherein the at least one first ring oscillator is configured to operate with a first oscillation frequency,
wherein the at least one second ring oscillator is configured to operate with a second oscillation frequency,
wherein the first counter circuit is arranged between at least one first ring oscillator and the processing circuit and configured to count a first number of complete signal runs through the at least one first ring oscillator between an application of a start signal to the at least one first ring oscillator to start the at least one first ring oscillator and an application of a stop signal to the at least one first ring oscillator to stop the at least one first ring oscillator,
wherein the second counter circuit is arranged between at least one second ring oscillator and the processing circuit and configured to count a second number of complete signal runs through the at least one second ring oscillator between an application of the start signal to the at least one second ring oscillator to start the at least one second ring oscillator and an application of a stop signal to the at least one second ring oscillator to stop the at least one second ring oscillator, and
wherein the processing circuit is configured to determine a magnitude of the strain applied on the substrate depending on the first and second oscillation frequencies.

12. The electric circuitry of claim 11, wherein the at least one first and second ring oscillators are started in common at the same time.

13. The electric circuitry of claim 11, wherein a respective oscillation of the at least one first and second ring oscillators is started by individual start signals.

14. The electric circuitry of claim 11, further comprising:
- a chain of early-late-detector units configured to detect a state of the at least one first and second ring oscillators,
- wherein each of the early-late-detector units is coupled to a respective one of the delay elements of the at least one first and second ring oscillators, and
- wherein the chain of the early-late-detector units is embodied such that at least one of the early-late-detector units generates the stop signal when the one of the early-late-detector units detects that the respective one of the delay elements of the at least one first ring oscillator connected to the one of the early-late-detector units and a respective one of the delay elements of the at least one second ring oscillator connected to the one of the early-late-detector units change its respective state at the same time.

15. The electric circuitry of claim 14, wherein the processing circuit is configured to:
- determine a first value representing a number of complete signal runs through the at least one first ring oscillator past between the applications of the start and stop signals, and a current state of the at least one first ring oscillator detected by the chain of early-late-detector units,
- determine a second value representing a number of complete signal runs through the at least one second ring oscillator past between the application of the start and stop signals, and a current state of the at least one second ring oscillator detected by the chain of early-late detector units, and
- determine the magnitude of the strain applied on the substrate based on a ratio of the first value and the second value.

* * * * *